US010929689B2

(12) United States Patent
Riggi

(10) Patent No.: US 10,929,689 B2
(45) Date of Patent: Feb. 23, 2021

(54) USING A CAMERA TO ASSIST FORWARD VEHICLES IN A CARAVAN

(71) Applicant: Robert Bosch GmbH, Stuttgart (DE)

(72) Inventor: Frank Riggi, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 15/729,215

(22) Filed: Oct. 10, 2017

(65) Prior Publication Data

US 2019/0108406 A1 Apr. 11, 2019

(51) Int. Cl.
| | |
|---|---|
| *G06K 9/00* | (2006.01) |
| *G08G 1/00* | (2006.01) |
| *G05D 1/02* | (2020.01) |
| *B60W 50/14* | (2020.01) |
| *B60R 1/00* | (2006.01) |
| *B60Q 9/00* | (2006.01) |
| *G06F 3/0484* | (2013.01) |

(52) U.S. Cl.
CPC .......... *G06K 9/00791* (2013.01); *B60Q 9/00* (2013.01); *B60R 1/00* (2013.01); *B60W 50/14* (2013.01); *G05D 1/0287* (2013.01); *G08G 1/22* (2013.01); *B60R 2300/301* (2013.01); *B60R 2300/80* (2013.01); *B60W 2050/143* (2013.01); *B60W 2050/146* (2013.01); *B60W 2420/42* (2013.01); *B60W 2554/801* (2020.02); *G06F 3/04842* (2013.01)

(58) Field of Classification Search
CPC ............. B60W 2550/30; B60W 30/09; B60W 30/162; B60W 30/165; B60W 2550/306; B60W 2550/308; B60W 2750/306; B60W 50/14; G06K 9/00825; G06K 9/00791; G08G 1/22; G05D 1/0287
See application file for complete search history.

(56) References Cited

U.S. PATENT DOCUMENTS

| | | | |
|---|---|---|---|
| 5,487,116 A * | 1/1996 | Nakano .............. | G06K 9/00798 382/104 |
| 9,434,382 B1 | 9/2016 | Prokhorov et al. | |
| 9,632,507 B1 | 4/2017 | Korn | |
| 2014/0063064 A1 | 3/2014 | Seo et al. | |

(Continued)

FOREIGN PATENT DOCUMENTS

| | | |
|---|---|---|
| CA | 2932642 A1 | 12/2016 |
| EP | 1681663 A1 | 7/2006 |

(Continued)

*Primary Examiner* — Kenny A Cese
(74) *Attorney, Agent, or Firm* — Michael Best & Friedrich LLP

(57) ABSTRACT

A system for tracking a following vehicle by a leading vehicle. In one example, the system includes a user interface, a camera, an output device, and an electronic controller. The electronic controller is configured to receive, via the user interface, an indication of the following vehicle and recognize the following vehicle. The electronic controller tracks the following vehicle using a video feed from the camera and determines whether the following vehicle is struggling to follow the leading vehicle. The electronic controller also generates a driver notification when the following vehicle is struggling to follow the leading vehicle and outputs, via the output device, the driver notification.

13 Claims, 5 Drawing Sheets

(56) References Cited

U.S. PATENT DOCUMENTS

| | | | |
|---|---|---|---|
| 2015/0254985 A1* | 9/2015 | Fisher | G06K 9/00362 |
| | | | 348/148 |
| 2016/0267796 A1* | 9/2016 | Hiroma | H04L 51/20 |
| 2016/0362048 A1* | 12/2016 | Matthews | G01S 19/14 |
| 2017/0011633 A1 | 1/2017 | Boegel | |
| 2017/0053534 A1* | 2/2017 | Lokesh | G08G 1/22 |
| 2017/0132477 A1 | 5/2017 | Kim et al. | |
| 2017/0210404 A1* | 7/2017 | Brooks | B61L 23/34 |
| 2017/0225691 A1* | 8/2017 | Yamada | B60W 50/10 |
| 2018/0144640 A1* | 5/2018 | Price | G07C 5/008 |
| 2018/0190128 A1* | 7/2018 | Saigusa | G08G 1/22 |
| 2018/0225975 A1* | 8/2018 | Park | G08G 1/052 |

FOREIGN PATENT DOCUMENTS

| | | | | |
|---|---|---|---|---|
| WO | 2014145918 A1 | 9/2014 | | |
| WO | 2017022881 A1 | 2/2017 | | |
| WO | WO-2017022881 A1 * | 2/2017 | ...... | B60W 30/18163 |

\* cited by examiner

USING A CAMERA TO ASSIST FORWARD VEHICLES IN A CARAVAN

FIELD

Embodiments relate to a leading vehicle tracking a following vehicle.

BACKGROUND

Sometimes two or more vehicles will travel together, as a caravan, from the same starting location to the same destination. When multiple vehicles travel together one vehicle is often designated as the lead vehicle. The other vehicles in the caravan or group agree to follow the lead vehicle in a single file line. Every driver of a vehicle in the caravan (excluding the driver of the last vehicle) must pay attention to the vehicle following them so that the vehicles in the group do not become separated. If the driver forgets to check on the vehicle following the leading vehicle for a few minutes, the leading vehicle may lose the vehicle that is following.

SUMMARY

One embodiment provides a system for tracking a following vehicle from a leading vehicle. The system includes a user interface, a camera, an output device, and an electronic controller. The electronic controller is configured to receive, via the user interface, an indication of the following vehicle and to recognize the following vehicle. The electronic controller tracks the following vehicle using a video feed from the camera and determines whether the following vehicle is struggling to follow the leading vehicle. The electronic controller also generates a driver notification when the following vehicle is struggling to follow the leading vehicle and outputs, via the output device, the driver notification.

Another embodiment provides a method of tracking a following vehicle from a leading vehicle. The method includes receiving, from a user interface, an indication of the following vehicle and recognizing the following vehicle with an electronic controller. The method also includes tracking the following vehicle using video feed from a camera and using the electronic controller to determine whether the following vehicle is struggling to follow the leading vehicle. The method further comprises generating, with the electronic controller, a driver notification when the following vehicle is struggling to follow the leading vehicle and outputting the driver notification via an output device.

Other aspects will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
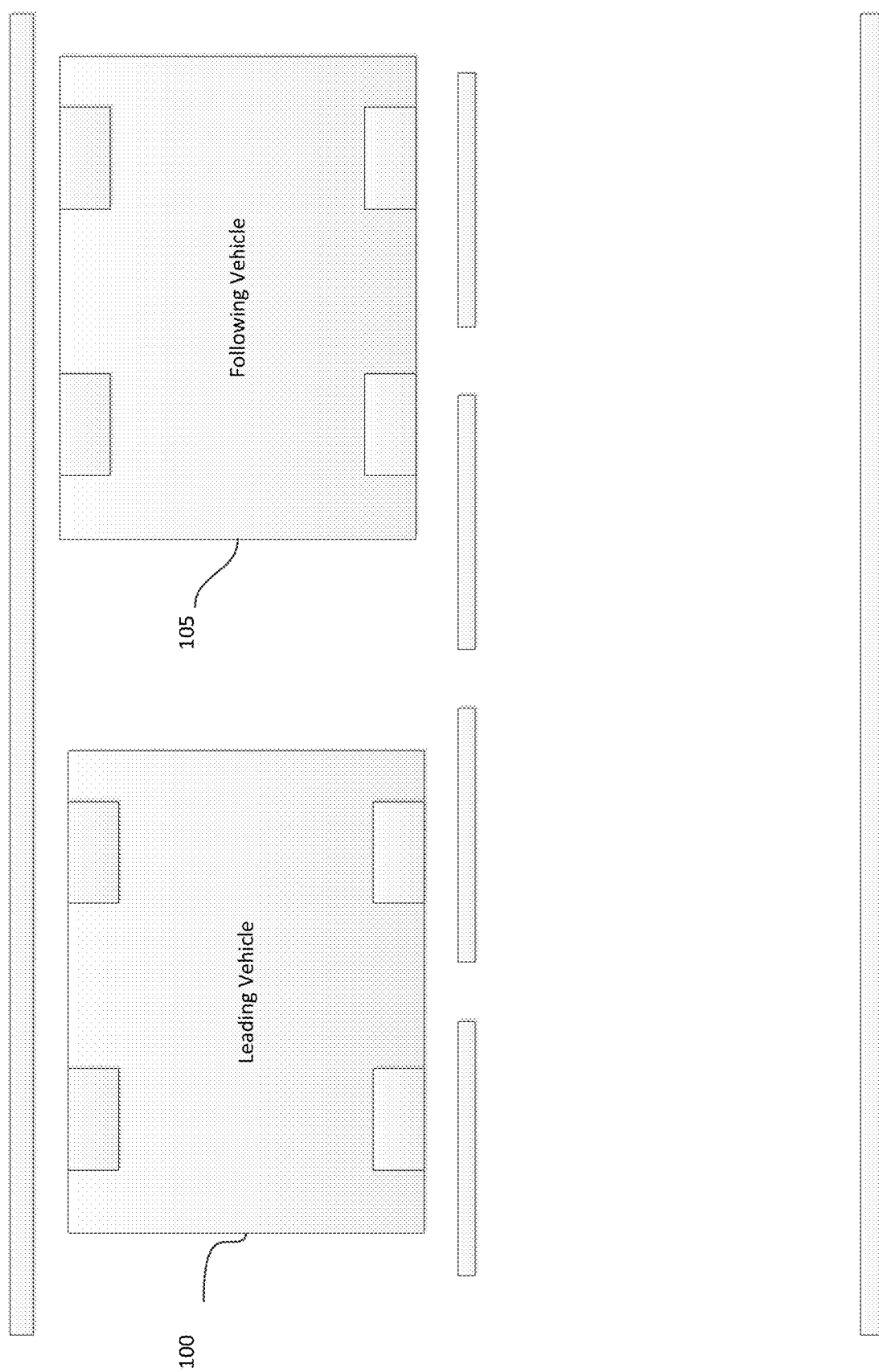
FIG. 1 is a block diagram of a leading vehicle and a following vehicle traveling together on a road.
Figure 2:
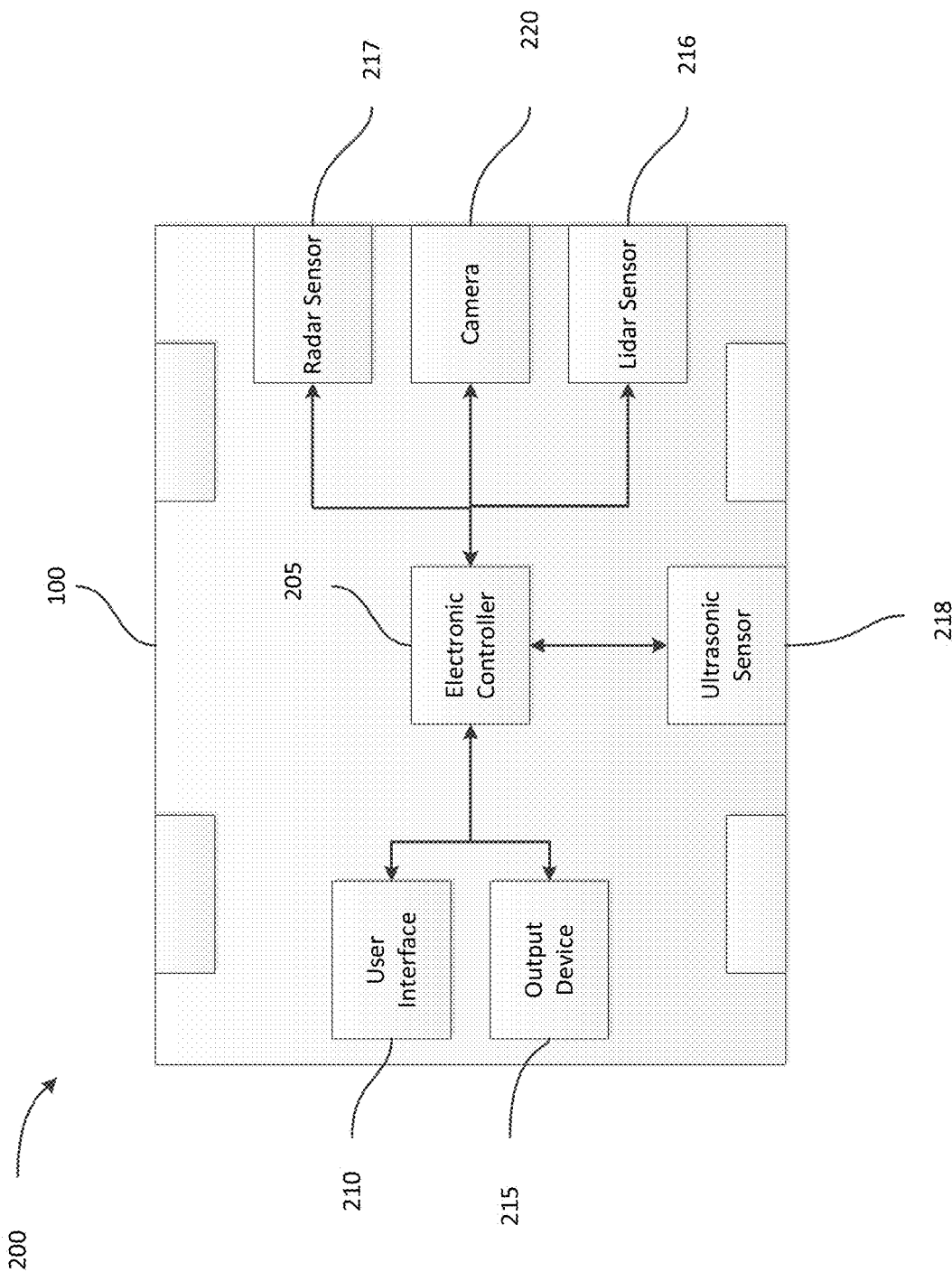
FIG. 2 is a block diagram of a vehicle equipped with a system for tracking a following vehicle from a leading vehicle.

FIG. 1 illustrates two vehicles travelling together in a caravan. A leading vehicle 100 is being followed by a following vehicle 105. The leading vehicle 100, although illustrated as a four-wheeled vehicle, may encompass various types and designs of vehicles. For example, the leading vehicle 100 may be an automobile, a motorcycle, a truck, a bus, a semi-tractor, and others. The following vehicle 105, although illustrated as a four-wheeled vehicle, may also encompass various types and designs of vehicles. For example, the following vehicle 105 may be an automobile, a motorcycle, a truck, a bus, a semi-tractor, and others. FIG. 2 illustrates the leading vehicle 100 with a system 200 for tracking a following vehicle from a leading vehicle. The leading vehicle 100 includes at least some autonomous functionality, but may also require a driver or operator to perform driving functions. In the example illustrated, the system 200 includes several hardware components including an electronic controller 205, a user interface 210, an output device 215, a lidar sensor 216, a radar sensor 217, an ultrasonic sensor 218, and a camera 220. The components of the system 200 may be of various constructions and may use various communication types and protocols.

The electronic controller 205 may be communicatively connected to the user interface 210, the output device 215, lidar sensor 216, radar sensor 217, ultrasonic sensor 218, and the camera 220 via various wired or wireless connections. For example, in some embodiments, the electronic controller 205 is directly coupled via a dedicated wire to each of the above-listed components of the system 200 for tracking a following vehicle from a leading vehicle. In other embodiments, the electronic controller 205 is communicatively coupled to one or more of the components via a shared communication link such as a vehicle communication bus (for example, a controller area network (CAN) bus) or a wireless vehicle network.

Each of the components of the system 200 for tracking a following vehicle from a leading vehicle may communicate with the electronic controller 205 using various communication protocols. The embodiment illustrated in FIG. 2 provides but one example of the components and connections of the system 200 for tracking a following vehicle from a leading vehicle. However, these components and connections may be constructed in other ways than those illustrated and described herein. For example, the electronic controller 205 may be located on the camera 220, a surround view system, or the user interface 210.

Figure 3:
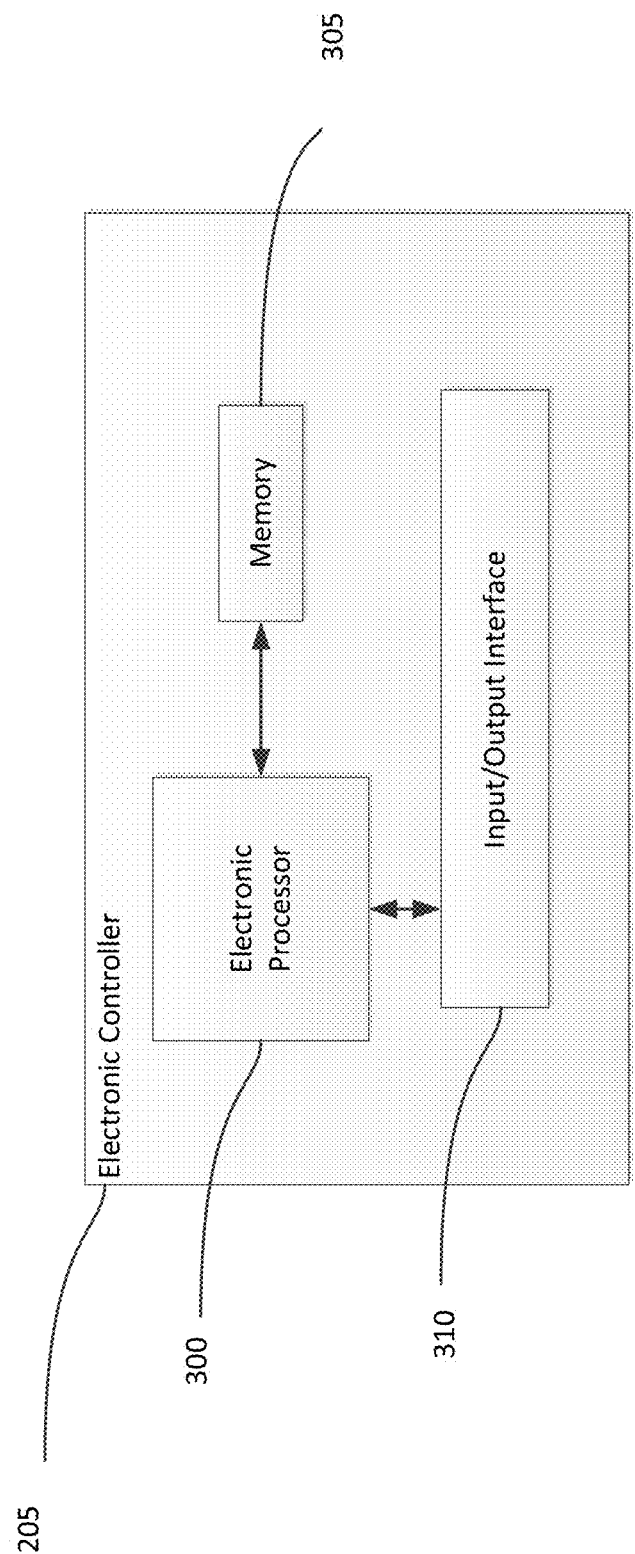
FIG. 3 is a block diagram of an electronic controller of the system of FIG. 2.

FIG. 3 is a block diagram of the electronic controller 205 of the system of FIG. 2. The electronic controller 205 includes a plurality of electrical and electronic components that provide power, operation control, and protection to the components and modules within the electronic controller 205. In the example illustrated, the electronic controller 205 includes, among other things, an electronic processor 300 (such as a programmable electronic microprocessor, microcontroller, or similar device), a memory 305 (for example, non-transitory, machine readable memory), and an input/output interface 310. The electronic processor 300 is communicatively connected to the memory 305 and the input/output interface 310. The electronic processor 300, in coordination with the memory 305 and the input/output interface 310, is configured to implement, among other things, the methods described herein.

The electronic controller 205 may be implemented in several independent controllers (for example, programmable electronic control units) each configured to perform specific functions or sub-functions. Additionally, the electronic controller 205 may contain sub-modules that include additional electronic processors, memory, or application specific integrated circuits (ASICs) for handling input/output functions, processing of signals, and application of the methods listed below. In other embodiments, the electronic controller 205 includes additional, fewer, or different components.

Figure 4:
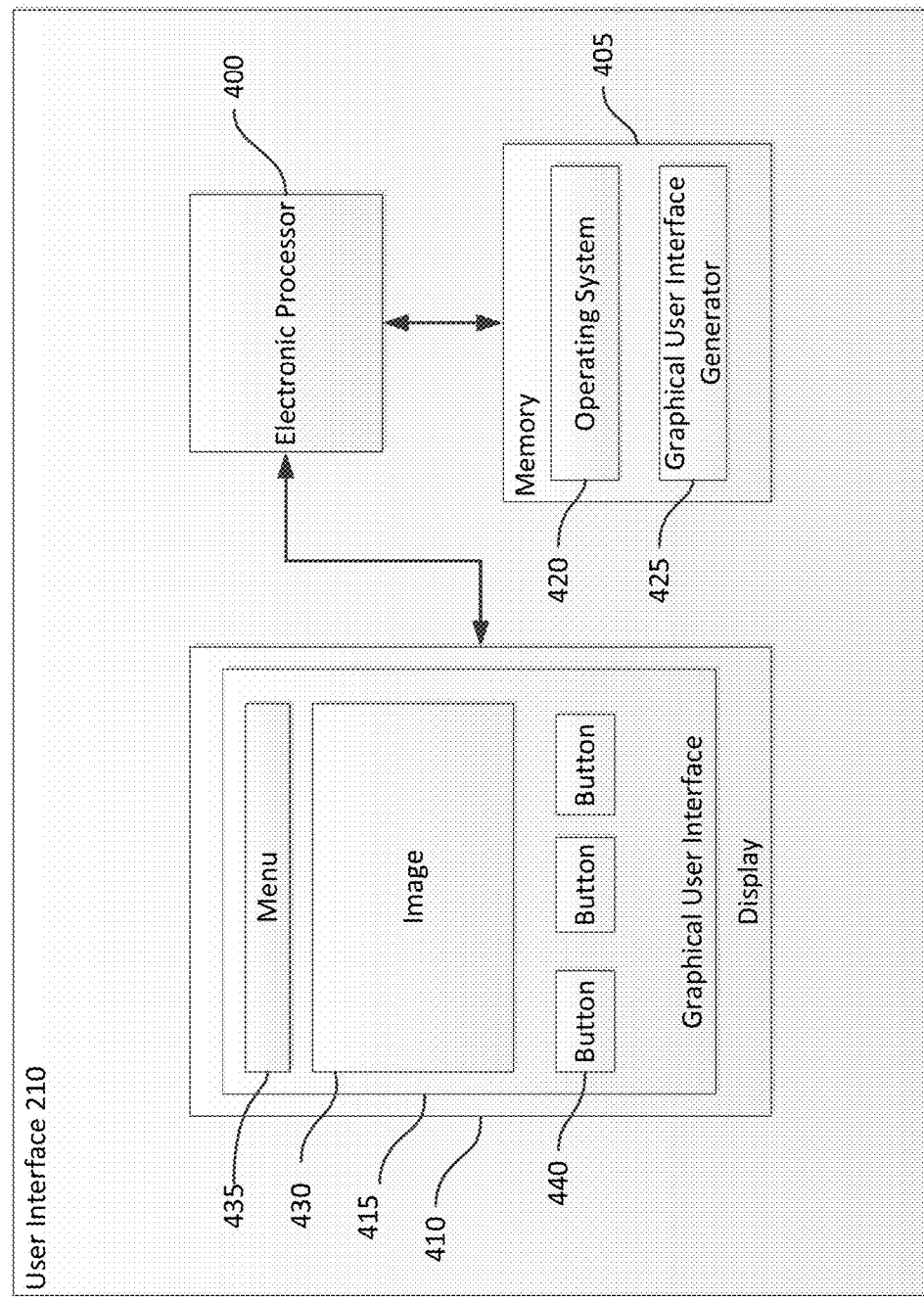
FIG. 4 is a block diagram of a user interface of the system of FIG. 2.

FIG. 4 is a block diagram of the user interface 210 of the system of FIG. 2. The user interface 210 includes, among other things, an electronic processor 400 (such as a programmable electronic microprocessor, microcontroller, or similar device), a memory 405 (for example, non-transitory, machine readable memory), and a display 410. The electronic processor 400 is communicatively connected to the memory 405 and the display 410. The memory 405 has stored within it several software components for creating a graphical user interface 415 and processing user input, including an operating system 420 and a graphical user interface generator 425. The electronic processor 400, in coordination with the memory 405 and the display 410, is configured to generate the graphical user interface 415 and receive user input from the display 410. The display 410 is a screen displaying the graphical user interface 415. One or more images 430 captured by the camera 220 may be displayed within the graphical user interface 415. The graphical user interface 415 may also display elements such as a menu 435 and virtual buttons 440. The user is able to input information into the display 410 in a variety of ways, such as selecting via a mouse or touching the image 430, the menu 435, or the virtual buttons 440.

Figure 5:
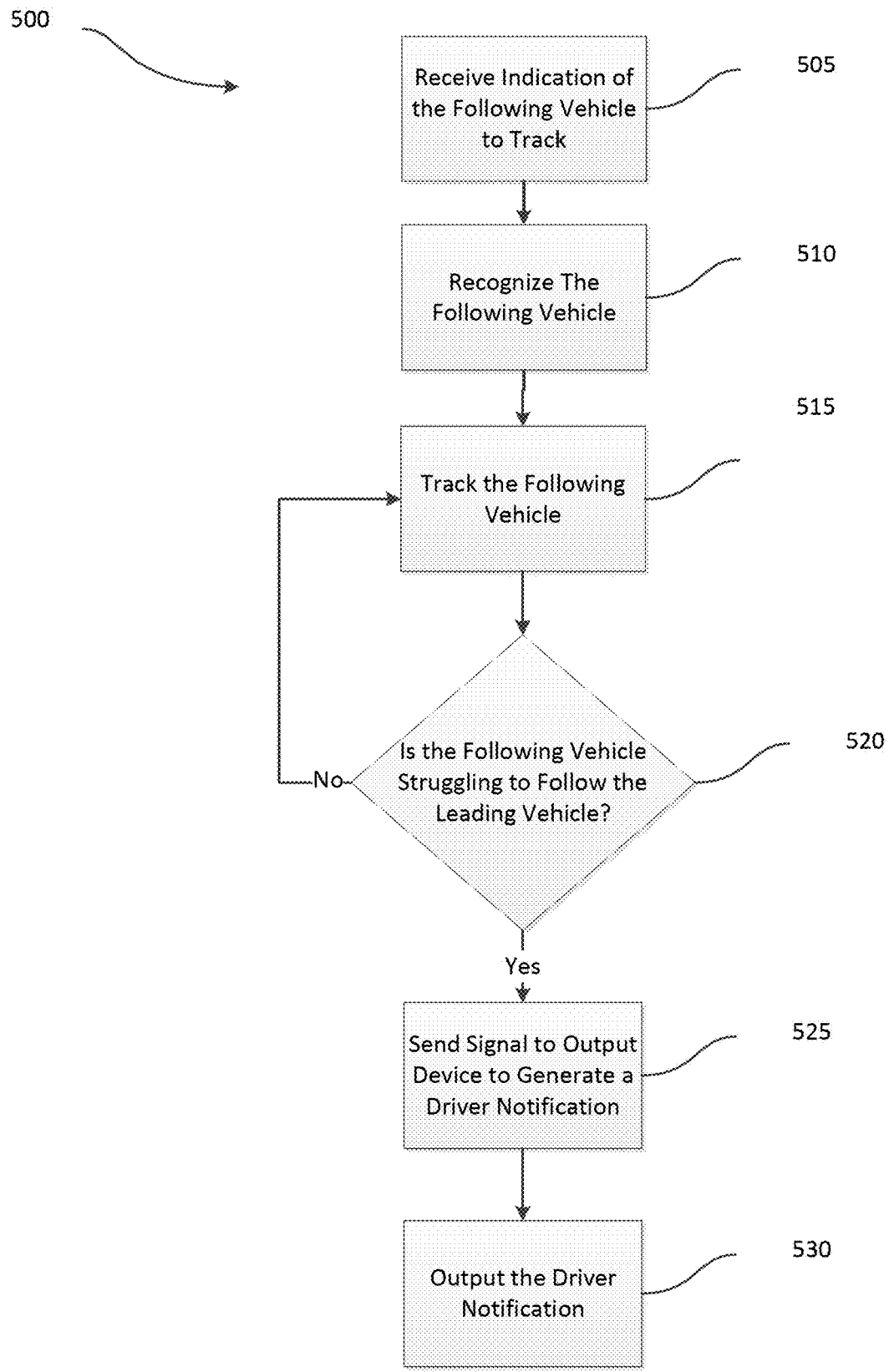
FIG. 5 is a flowchart of a method of tracking a following vehicle from a leading vehicle.

FIG. 5 illustrates a method 500 of tracking a following vehicle from a leading vehicle. The driver of the leading vehicle 100 provides an indication, via the user interface 210, of the type of driver notification the output device 215 should output when the electronic controller 205 detects that the following vehicle 105 is struggling to follow the leading vehicle 100. The driver of the leading vehicle 100 also provides an indication, via the user interface 210, of which of the one or more vehicles visible in the image or video feed from the camera 220 is the following vehicle 105 to track (block 505). In one embodiment, the electronic controller 205 has been trained using computer vision algorithms to recognize vehicles in the image 430. The electronic controller 205 displays a group of vehicles that it recognizes in the image 430 as options from which the driver can select a vehicle to be stored in memory 305 as the following vehicle 105. Alternatively, the driver can select a vehicle to be stored in memory 305 as the following vehicle 105 from the one or more vehicles displayed in the image 430. For example, if the driver does not see the vehicle they wish to select as the following vehicle 105 displayed as an option the driver selects the following vehicle 105 in the image 430 by drawing a box in the image 430 around the vehicle to be stored in memory 305 as the following vehicle 105 (block 510). The electronic controller 205 uses computer vision algorithms to recognize the vehicle that the driver has selected. The electronic controller 205 recognizes and stores the vehicle that the driver has selected in memory 305 as the following vehicle 105 (block 510).

In one embodiment, the electronic controller 205 tracks the position of the following vehicle 105 using the lidar sensor 216, radar sensor 217, ultrasonic sensor 218, camera 220, or a combination of the foregoing (block 515). The electronic controller 205 determines if the following vehicle 105 is struggling to follow based on one or more conditions or a combination of these conditions. For example, the electronic controller determines that the following vehicle 105 is struggling to follow the leading vehicle 100 by comparing the position of the following vehicle 105 to several predetermined thresholds (block 520). For example, the electronic controller 205 detects a lateral distance that the following vehicle 105 has deviated from the leading vehicle 100 and compares the detected lateral distance to a predetermined lateral distance. If the detected lateral distance is above the predetermined lateral distance, the electronic controller 205 determines that the following vehicle 105 is struggling to follow the leading vehicle 100. The electronic controller 205 may also compare a distance between the leading vehicle 100 and the following vehicle 105 to a predetermined distance. If the following vehicle 105 is further behind the leading vehicle 100 than the predetermined distance, the electronic controller 205 determines that the following vehicle 105 is struggling to follow the leading vehicle 100. In another example, the electronic controller 205 compares a time interval that the following vehicle 105 has not been detected by the lidar sensor 216, radar sensor 217, ultrasonic sensor 218, or camera 220 to a predetermined time interval. If the following vehicle 105 has not been detected by the lidar sensor 216, radar sensor 217, ultrasonic sensor 218, or camera 220 for the predetermined time interval or longer the electronic controller 205 determines that the following vehicle 105 is struggling to follow the leading vehicle 100.

If the electronic controller 205 detects that the following vehicle 105 is struggling to follow the leading vehicle 100, the electronic controller 205 sends a signal to the output device 215 to generate a driver notification (block 525). The driver notification output by the output device 215 (block 530) may be an audio notification, such as a beep or a prerecorded message, and/or a visual notification, such as a dash board light. If the electronic controller 205 knows a speed of the following vehicle 105 and the distance between the following vehicle 105 and the leading vehicle 100 the output device 215 outputs, as part of the driver notification, the speed of the following vehicle 105, the distance between the following vehicle 105 and the leading vehicle 100, a suggested action to improve following of the leading vehicle 100 by the following vehicle 105, or a combination of the foregoing. For example, the suggested action may be slowing the leading vehicle 100 to a speed which reduces the distance between the leading vehicle and the following vehicle 105.

Various features and advantages are set forth in the following claims.

The invention claimed is:

1. A system for tracking a following vehicle from a leading vehicle, the system comprising:
a leading vehicle, the leading vehicle including;
a user interface;
a camera that generates a video feed;
an output device; and
an electronic controller configured to
receive the video feed from the camera and display the video feed within the user interface;
receive, via the user interface, an indication of the following vehicle to track when a user selects the following vehicle from a group of vehicles within the video feed from the camera;
recognize the following vehicle using the video feed;
track the following vehicle using the video feed;
determine, using the video feed, whether the following vehicle is struggling to follow the leading vehicle;
generate a driver notification when the following vehicle is struggling to follow the leading vehicle; and
output, via the output device, the driver notification.

2. The system as claimed to claim 1, wherein the electronic controller is configured to be located on the camera, a surround view system, or the user interface.

3. The system as claimed to claim 1, wherein the following vehicle is struggling to follow the leading vehicle if:
the following vehicle is a predetermined distance behind the leading vehicle,
the following vehicle is not detected by the camera for a predetermined time interval,
the following vehicle deviates a predetermined lateral distance from the leading vehicle, or
a combination of the foregoing.

4. The system as claimed to claim 1, wherein the driver notification is an audio or visual notification, and includes at least one selected from a group consisting of a speed of the following vehicle, a distance between the following vehicle and the leading vehicle, and a suggested action to improve following of the leading vehicle by the following vehicle.

5. The system as claimed to claim 4, wherein the driver notification output by the output device is selected via the user interface.

6. The system as claimed to claim 1, wherein the system includes a lidar sensor, a radar sensor, and an ultrasonic sensor and the system tracks the following vehicle using input from the lidar sensor, radar sensor, and ultrasonic sensor in addition to the video feed from the camera.

7. A method of tracking a following vehicle from a leading vehicle, the method comprising:
generating, via a camera, a video feed;
receiving, at an electronic controller, the video feed from the camera;
displaying, via the electronic controller, the video feed within a user interface;
receiving, via the user interface, an indication of the following vehicle to track when a user selects the following vehicle from a group of vehicles within the video feed from a camera included in a leading vehicle;
recognizing, via the electronic controller included in the leading vehicle, the following vehicle using the video feed;
tracking the following vehicle, via the electronic controller, using the video feed;
determining, with the electronic controller, whether the following vehicle is struggling to follow the leading vehicle using the video feed; and
generating, with the electronic controller, a driver notification when the following vehicle is struggling to follow the leading vehicle,
outputting, via an output device, the driver notification.

8. The method as claimed to claim 7, wherein the electronic controller is located on the camera, a surround view system, or the user interface.

9. The method as claimed to claim 7, wherein the following vehicle is struggling to follow the leading vehicle if:
the following vehicle is a predetermined distance behind the leading vehicle,
the following vehicle is not detected by the camera for a predetermined time interval,
the following vehicle deviates a predetermined lateral distance from the leading vehicle, or
a combination of the foregoing.

10. The method as claimed to claim 7, wherein the driver notification is an audio or visual notification, and includes at least one selected from a group consisting of a speed of the following vehicle, a distance between the following vehicle and the leading vehicle, and a suggested action to improve following of the leading vehicle by the following vehicle.

11. The method as claimed to claim 10, wherein the driver notification output by the output device is selected via the user interface.

12. The method as claimed to claim 7, wherein the electronic controller has been trained, with computer vision algorithms, to recognize the following vehicle.

13. The method as claimed to claim 7, wherein tracking the following vehicle, via the electronic controller, includes using input from a lidar sensor, a radar sensor, and an ultrasonic sensor in addition to the video feed from the camera.

* * * * *